United States Patent Office 2,798,927
Patented July 9, 1957

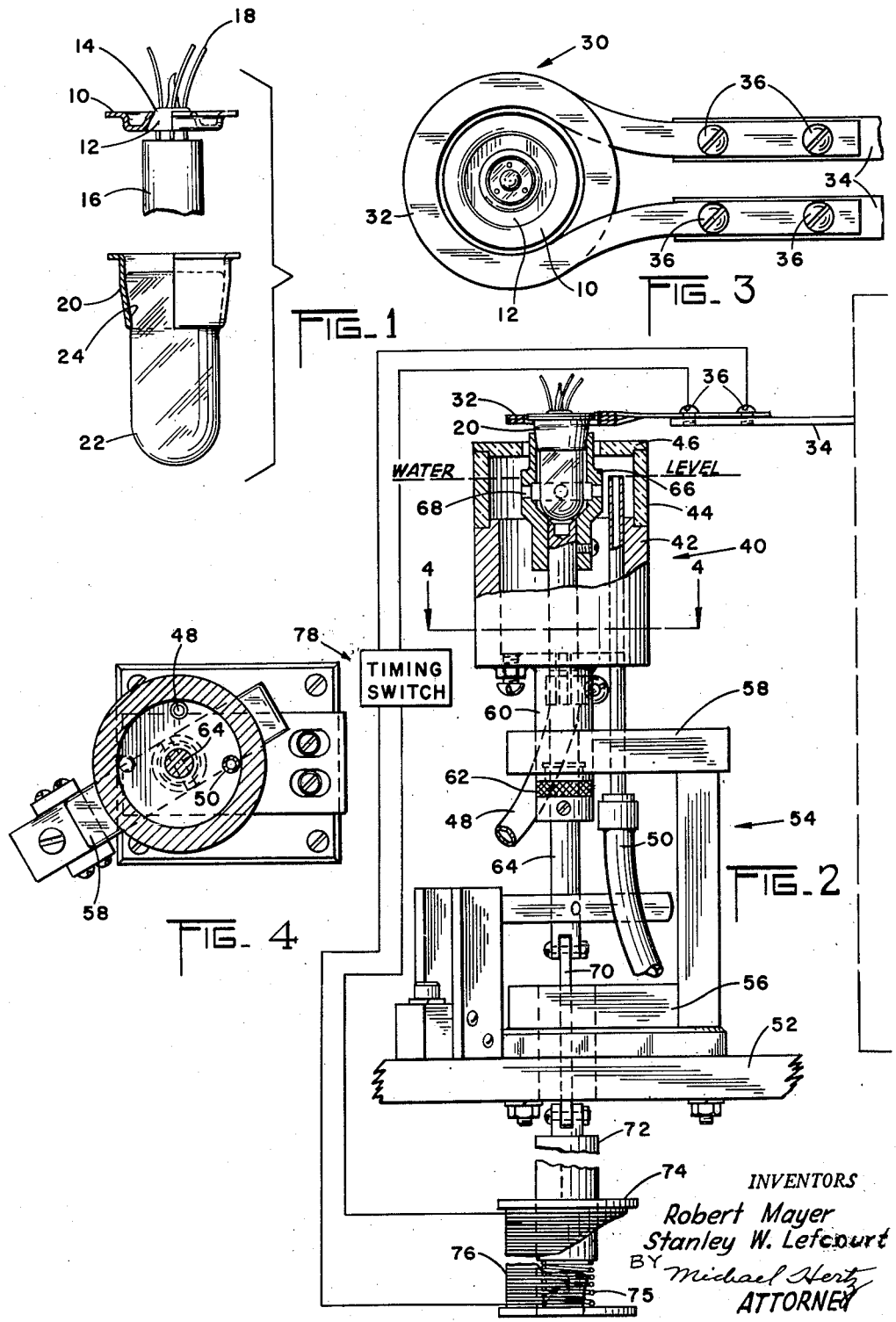

2,798,927
INDUCTION FLASH WELDER

Stanley Warren Lefcourt, Bronx, N. Y., and Robert Mayer, Havertown, Pa., assignors to Sylvania Electric Products Inc., a corporation of Massachusetts Application January 30, 1956, Serial No. 562,123

3 Claims. (Cl. 219—9.5)

This invention relates to a method of welding, more particularly to an induction flash welding apparatus suitable for use in making welds in close proximity to areas which cannot withstand a high temperature rise.

There are articles, as for example certain radio tubes, in which the outer sheel is made of sections of glass and metal sealed together. In tubes of this character it has previously been customary to make the final seal in the form of a brazed joint. In view of the fact that in the type of tube under consideration a metal-to-glass seal is fairly close to the area at which the metal parts are to be brazed together, in the prior art a pre-heating of the glass-to-metal seal was necessary before the weld could be effected. Subsequent to the sealing, it was necessary to anneal the glass-to-metal seal. The method for accomplishing this took at least 15 minutes and frequently resulted in a considerable loss in tubes due to conduction of heat to the previous seals, with harmful results at those seals.

The object of this invention is to produce a practical means for making a metal weld close to other seals, such as a glass-to-metal seal, rapidly and with no deleterious effect on adjacent seals.

A further object of this invention is to make an improved welding apparatus which will operate economically.

Other objects will be apparent after reading the following specification in association with the accompanying drawings in which:

Fig. 1 is an elevation, partly in section, of exploded parts of a radio tube in which a metal base in which is sealed a glass button carrying a tube mount is to be welded to a collar which has been sealed to a glass envelope.

Fig. 2 is a front elevation partly in section of an embodiment of a flash welder.

Fig. 3 is a plan view of the induction welding coil and the tube base when positioned therein for welding.

Fig. 4 is a sectional view along the line 4—4 of Fig. 2.

Parts of vacuum tubes can readily be welded by the induction flash welder of this invention even though such welds are to be made in close proximity to a soft glass-to-metal seal without damage to the seal. In the disclosed embodiment of the invention, the induction flash welder consists broadly in the combination of an induction welding coil, a cooling sytem, a jig for holding the tube in position, a tube immersing mechanism and also, preferably, though not necessarily a timing mechanism.

In Fig. 1 which illustrates an exploded view of an electronic tube of the type in which the weld joint is to be made close to a glass-to-metal seal, a base plate 10 is sealed to a glass button 12 by a seal 14. This glass button forms the seal through which the electrode mount 16 can be brought into electrical contact with a circuit by means of leads 68 which pass therethrough. The remainder of the electronic tube envelope shown consists of a metallic collar 20 and a glass bulb 22 which is sealed to the collar at 24.

The work coil 30 may be of any suitable design. It is herein shown as a substantially two turn ribbon of copper 32 attached to a radio frequency line 34 by means of screws 36. In Fig. 2 which shows the arrangement of the parts at the time the weld is being made, the work coil is shown in position above a water container 40 with the electronic tube held by the jig in such position that the metallic parts which are to be welded are in the confines of and completely surrounded by the work coil. The water container herein shown is a metallic cylinder 42 with a ceramic ring 44 surmounted by an annular ceramic cover plate 46. The cylinder is provided with a water inlet tube 48 and a water overflow tube 50. The inlet tube passes through the bottom of the container and terminates near the bottom. The overflow tube 50 extends upwardly inside of the container and is open at the height at which it is desired to keep the water level so that any water in excess of that desired will flow outwardly through the tube.

The water container 40 is suitably supported from a fixed support 52 by means of a C-shaped frame 54 having one arm 56 suitably fastened to support 52 and a second arm 58 secured to a guide sleeve 60 integral with the section 42 of the container and extending downwardly from the central portion of the bottom of the container. Passing through this guide sleeve and a suitable packing gland 62 is a rod 64, to the top of which is fastened a cup 66 for receiving and holding the electron tube during the period it is worked on by the coil 30. The bulb of the tube is free within the cup, the tube being supported at the edge of the cup by its collar 20 and the cup is provided with radial holes 68 to admit of free passage of water into the cup when the cup is plunged downwardly into the portion 42 of the container. Normally the tube is maintained above the water level by reason of the rod 64 being maintained in elevated position. The lower end of rod 64 is connected by a link 70 to the plunger 72 of a solenoid 74, the plunger being pressed upwardly by a spring 75. The coil 76 of the solenoid is connected to a timing switch 78.

When apparatus of the type illustrated in the drawing is brought into operation the parts are substantially as shown in Fig. 2 of the drawing with running water entering the container 40 through the tube 48 and leaving through the water outlet tube 50 when the water level reaches the top of the outlet tube. The jig, as shown, is in its topmost position to hold the two parts of the electronic tube in such position that the flanges to be welded are completely within the confines of the work coil 30. When the parts are so positioned the weld can take place immediately upon the activation of the work coil. The current supplied to this coil is brought thereto through a circuit having the timing device which shuts off the current after a time predetermined to be sufficient to make the weld. This is usually less than ⅕ of a second. When the timer cuts off the current to the induction coil 30, it instantly applies the current to the solenoid winding 76 which then pulls downwardly the plunger 72, connected to the rod 64 through link 70, and thus plunges the electronic tube held in the cup shaped element into the running water. The water absorbs the heat from the welded area very quickly and quenches the flow of heat beyond the original point of application. As soon as the parts have been sufficiently cooled, the timer deenergizes the solenoid and the rod and jig are caused to move into the uppermost position as shown in Fig. 2 whereupon the cooled electronic tube can be removed.

While the above description and drawing submitted herewith discloses a preferred and practical embodiment of the flash welding apparatus of this invention, it will be understood by those skilled in the art that the specific details of construction and arrangement of parts as shown and described are by way of illustration only and are not to be construed as limiting the scope of the invention.

Having thus described the invention what is claimed as new is:

1. A welding apparatus comprising a liquid container, a welding apparatus above the liquid in the container, means movable vertically and having a support for a tube within the container, said support being movable upwardly to bring a portion of a tube to be welded into welding relation with respect to the apparatus and downwardly to cooling relation with respect to the liquid in the container, and means for moving the support including an electromagnet and timing means to operate said electromagnet.

2. A welding apparatus comprising a liquid container, an induction coil above the liquid in the container, a support within the container movable upwardly to bring an article to be welded to a welding position with respect to the container and movable downwardly to cool the welded area by immersion in the liquid, an electromagnet for moving the support, a timer connected to the coil and electromagnet to discontinue the operation of the coil and simultaneously cause the electromagnet to effect movement of the support downwardly in the container.

3. A welding apparatus comprising an induction coil in a horizontal plane, a liquid container below said coil, means for maintaining liquid at a predetermined level in said container, a tube support movable vertically in said container, said support when in its upper position supporting a tube with parts to be welded in the opening of the coil, a vertical rod mounting the support, the rod passing through the bottom of the container, an electromagnet and associated means for lowering and raising the rod, and timing means for cutting off the current to the coil and simultaneously energizing the electromagnet to plunge the welded parts of the tube into the liquid and for subsequently cutting off the energy to the electromagnet to allow the support to rise above the liquid level for tube removal from its support.

References Cited in the file of this patent

UNITED STATES PATENTS

| | | |
|---|---|---|
| 2,279,854 | Whitney | Apr. 14, 1942 |
| 2,484,333 | Cobb et al. | Oct. 11, 1949 |

OTHER REFERENCES

American Machinist, December 20, 1945, pages 131–133.